United States Patent

[11] 3,559,518

[72] Inventor Frank S. Domka
26841 Kean, Inkster, Mich. 48141
[21] Appl. No. 822,356
[22] Filed May 7, 1969
[45] Patented Feb. 2, 1971

[54] CUTTING DIE APPARATUS
3 Claims, 4 Drawing Figs.
[52] U.S. Cl. .................................................. 83/124,
83/128, 83/140, 83/653
[51] Int. Cl. ................................................. B26f 1/14,
B26d 7/18
[50] Field of Search ......................................... 83/124,
128, 140, 653

[56] References Cited
UNITED STATES PATENTS
2,191,836 2/1940 Stromberg et al. ............ 83/124X Primary Examiner—James M. Meister
Attorney—Settle, Batchelder & Oltman ABSTRACT: Cutting die apparatus incorporating a series of individual stripper-ejector devices spaced along a steel rule-cutting die. These devices are operative both to strip the cut material from the die and eject the cutout portion.

PATENTED FEB 2 1971          3,559,518

INVENTOR.
FRANK S. DOMKA.
BY
SETTLE, BATCHELDER & OLTMAN.
ATT'YS.

CUTTING DIE APPARATUS

This invention relates to improvements in cutting die apparatus of the self-cleaning type.

Whenever large circular or irregular openings are to be formed in sheet material made of cork, paper, plastic, and the like, the steel rule-type die has been found to be very useful because of its ability to be quickly and easily shaped to these large and irregular shapes without compromising cutting efficiency. There is, however, the problem of die cleaning because the customary practice of having structures shaped similar to that of the cutout portion becomes costly and impractical with these large and irregularly shaped dies.

Accordingly, there is contemplated new and different cutting die apparatus incorporating a rule die with a unique cleaning provision.

Also, contemplated by the invention is cutting apparatus employing a rule die and a novel device for providing dual cleaning operations after the material is cut.

Another objective is to provide cutting apparatus wherein a series of individual stripper-ejector devices are spaced along a rule die and together both strip the material from the rule die and eject the cutout portion.

Also an objective is the provision for a unique stripper-ejector device that utilizes a single component for carrying out both material stripping and cutout ejection.

The foregoing and other objects and advantages of the invention will become apparent from the following description and from the accompanying drawings in which.

Figure 1:
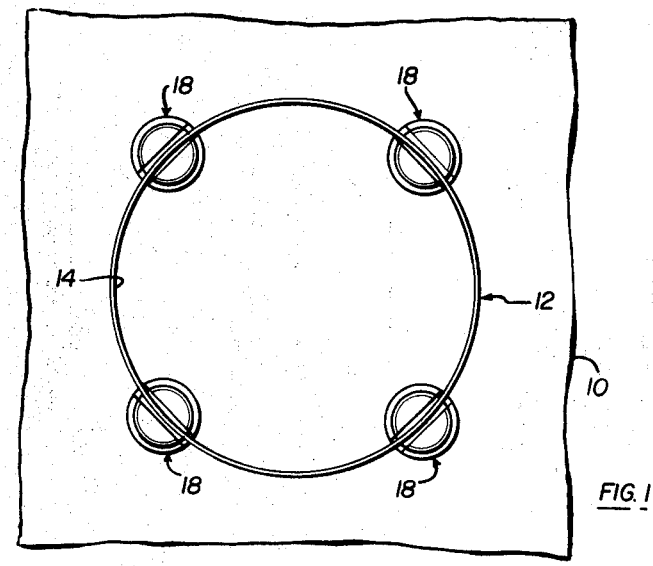
FIG. 1 is a plan view of cutting apparatus incorporating the principles of the invention.

Referring now to the drawings in detail and first to FIG. 1, the cutting apparatus includes a supporting member or platen 10 on which is suitably mounted a steel rule die 12 of continuous configuration shaped to cut an opening 14 in sheetlike material 16 of cork, paper, plastic or the like. By way of example only, the apparatus may be used to make cork engine head gaskets. The platen 10 as is well understood, is appropriately attached to a press (not shown) which urges the die's cutting edge 17 through the material 16 which is positioned on the press bed. Thereafter the platen 10 is withdrawn and the die 12 must be cleaned, i.e., the material 16 must be removed from the cutting edge 17 of the die 12 and also the slug or the cutout portion must be ejected from the die opening 14 before the apparatus can continue in operation.

This cleaning is the function of a series of stripper-ejector devices, denoted by the numeral 18 in FIG. 1. These devices 18 are spaced along the steel rule die 12 as illustrated. The number of the devices 18 and their spacing will be determined by the kind of material, its thickness, the size and shape of the cut, the die type and size, and other factors well understood by those versed in the art. Each of the units 18 is fitted within a bore 20 in the platen 10 at one of several outwardly opening notches 21 formed in the die 12 (see FIGS. 2 and 3), and includes a housing or sleeve 22, a stripper-ejector 24 and a bias member, such as the coil spring assigned the numeral 26.

Figures 2, 3:
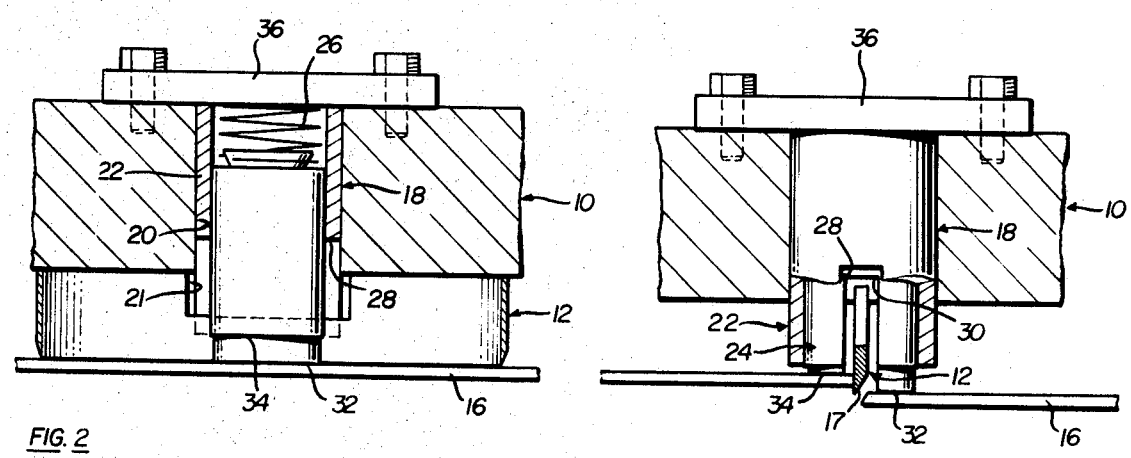
FIGS. 2 and 3 are sectional views of the FIG. 1 cutting apparatus, illustrating the cutting apparatus prior to the material being cut and after the material has been cut, respectively.
Figure 4:
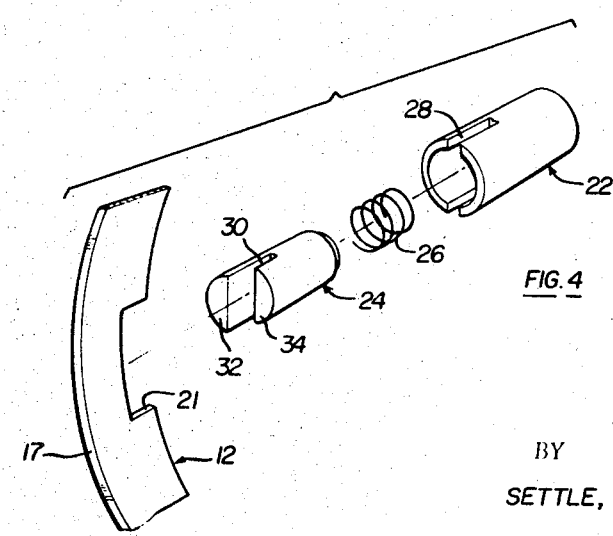
FIG. 4 is an expanded view of a stripper-ejector device utilized in the FIG. 1 apparatus.

Considering the individual components of the units 18 and first the sleeve 22, reference is made to FIG. 4. The sleeve 22 is provided with an axially extending slot 28. Now referring to FIG. 2, the sleeve 22 is shown positioned within the bore 20, so that the axial slot 28 embraces the rule die 12, and the part of die 12 within its bore constitutes the only restriction and prevents the sleeve 22 from rotating in the bore 20. Additionally, if needed, the axial extent of the slot 28 can be selected to insure that the bottom of the sleeve 22 as viewed in FIG. 2 is displaced from the cutting edge of the cutting die 12 an adequate distance to avoid interfering with the material 16. This distance should be equivalent at least to the thickness of the material 16.

The stripper-ejector 24 as depicted in FIG. 4, also has an axial extending slot 30 which likewise embraces the die 12 at the notch 21. The axial extent of this slot 30 is selected so that the stripper-ejector can move downwardly far enough before engaging the bottom of the notch 21 in the die 12 to insure that the material 16 is removed from the die 12. Of course, the bottom of the notch 21, when engaged by the bottom of the slot 30, prevents the stripper-ejector 24 from dropping out of the sleeve 22. The spring end or upper end, as shown in FIG. 2, of the stripper-ejector member 24 may, if preferred, be annularly recessed so that an end of the coil spring 26 can seal thereon. The other end of the stripper-ejector 24 has a stripper surface 32 and an ejector surface 34 separated by the axially extending slot 30. The stripper surface 30 extends axially a sufficient distance further than the ejector surface 32 to clean the material 16 from the die 12 so it will not be picked up when the die 12 is retracted. This stripping usually must be done relatively quickly. The ejection of the cutout portion corresponding in shape to the opening 14 can be done subsequently so that the cutoff portion can be appropriately discarded, e.g., by gravity when the platen 10 is swung to a position normal to the bed. This, of course, will be determined by the application of the apparatus.

The assembly of the stripper-ejector device 18 is completed by the attachment of a cover 36 to the platen 10. This cover 36 retains the springs 26 in the position demonstrated in FIG. 2 and of course, maintains the assembly in place.

Briefly summarizing the operation of the cutting apparatus, the platen 10 is brought into the cutting position shown in FIG. 2 with the material 16 to be cut in place, and then urged downwardly to cut the material 16 which is appropriately held on a bed (not shown). The coil springs 26 are compressed during the cutting and now when the platen 10 is withdrawn the coil springs 26 urge the stripper-ejector 24 downwardly, as seen in FIG. 3, to remove first with the stripper surface 32 the material from the cutting edge 17 and then the ejector surface 34 moves down and ejects the cutout portion of material to complete the cutting operation. The cutting apparatus is now clean and prepared for the next operation when the material 16 to be cut is again in position for this cutting operation.

From the foregoing, it will be appreciated that by the novel cutting apparatus a steel rule die can be used of any type of configuration, large or small, without concern for developing some kind of a material removing device of a shape similar to that of the cutout portion. Furthermore, the cutting apparatus is uncomplicated and easily maintained. The individual stripper-ejector devices 18 are inexpensive and are not restricted in their use to any particular shape or die.

I claim:

1. A cutting die comprising a supporting member, a rule cutting die having a mounting edge connected to the supporting member and an opposite cutting edge, the cutting die having an opening in the mounting edge formed so that the base thereof extends a predetermined distance from the cutting edge, a stripper-ejector device for removing material from the die, the device including a housing adapted to be positioned on the cutting die at the opening, a stripper-ejector member slidable within the housing and having an axially extending slot therein embracing the cutting die at the base of the opening and of a certain depth so as to restrict the extent of movement of the stripper-ejector member relative to the die cutting edge, the stripper-ejector member having end ejector surfaces separated by the slot and arranged on opposite sides of the die cutting edge for removing the cut material from the cutting die and a bias element for urging the stripper-ejector member toward the cutting edge.

2. A cutting die comprising a supporting member, a rule cutting die having a mounting edge connected to the supporting member and an opposite cutting edge, the cutting die having a series of notches opening outwardly from the mounting edge, the notches each having the base thereof extending to a predetermined distance from the cutting edge, a series of stripper-ejector devices for removing cut material from the die, one of the devices being associated with each notch, the devices each including an annular housing having an axially extending slot therein embracing the cutting die, proximate the base of the notch, a cylindrical stripper-ejector member slidable within the sleeve, the stripper-ejector member having an axially extending slot embracing the cutting die and of a certain depth so as to restrict the extend of movement of the stripper-ejector member relative to the die cutting edge, the stripper-ejector member having end stripper and ejector surfaces of different axial extents separated by the slot and arranged on opposite sides of the die cutting edge so that after the material is cut the surfaces are successively operative to remove the cut material from the cutting die and, a bias element for urging the stripper-ejector member toward the die cutting edge.

3. A cutting die comprising a supporting member, a continuous rule cutting die having a mounting edge connected to the supporting member and an opposite cutting edge, the rule cutting die being shaped so as to cut out openings within sheetlike material and having a series of notches opening outwardly from the mounting edge, the notches each having the base thereof extending a predetermined distance from the cutting edge and substantially parallel therewith, a series of stripper-ejector devices for removing cut material from the die, one of the devices being associated with each notch, the devices each including an annular sleevelike housing having an axially extending slot therein embracing the cutting die at the notch so that the housing has an end thereof on opposite sides of the cutting die and displaced from the cutting edge a distance greater than the thickness of the material to be cut, the housing also having an inner diameter less than the width of the notch so as to provide a through unrestricted bore, a cylindrical stripper-ejector member slidable within the housing bore, the stripper-ejector member having an axially extending slot embraces the cutting die at the notch and of a certain depth so as to limit the extent of relative movement between the stripper-ejector member and the die cutting edge, the stripper-ejector member including end stripper and ejector surfaces separated by the slot and arranged on opposite sides of the die cutting edge and a bias element positioned within the housing for urging the stripper-ejector member and the die cutting edge, the stripper surface being of a greater axial extent than the ejector surface so that the cut material is first removed thereby from the cutting die and then the cutout material is removed from the cutting die by the ejector surface.